United States Patent
Pardikes (10) Patent No.: US 6,951,892 B2
(45) Date of Patent: ***Oct. 4, 2005

(54) MEANS FOR AND METHODS OF USING A SELECTED ENERGY FACTOR TO APPLY A PAPER COATING

(75) Inventor: Dennis Pardikes, Palos Park, IL (US)

(73) Assignee: Norchem Industries, Inc., Tinley Park, IL (US)

( * ) Notice: Subject to any disclaimer, the term of this patent is extended or adjusted under 35 U.S.C. 154(b) by 934 days.

This patent is subject to a terminal disclaimer.

(21) Appl. No.: 09/755,239

(22) Filed: Jan. 5, 2001

(65) Prior Publication Data

US 2001/0049397 A1 Dec. 6, 2001

Related U.S. Application Data

(63) Continuation-in-part of application No. 09/136,677, filed on Aug. 19, 1998, now Pat. No. 6,207,719.

(51) Int. Cl.[7] .............................. B01F 5/06; B01F 5/02; B01F 17/52
(52) U.S. Cl. .......................... 516/67; 516/76; 516/924; 366/136; 366/176.1; 366/340; 162/168.1
(58) Field of Search ............................ 516/67, 76, 924; 162/168.1; 366/136, 176.1, 340

(56) References Cited

U.S. PATENT DOCUMENTS

| | | | | | |
|---|---|---|---|---|---|
| 2,516,884 | A | * | 5/1950 | Kyame | 127/28 |
| 3,582,048 | A | * | 6/1971 | Sarem | 366/340 |
| 4,057,223 | A | * | 11/1977 | Rosenberger | 366/136 |
| 4,274,749 | A | * | 6/1981 | Lake et al. | 366/132 |
| 5,219,912 | A | * | 6/1993 | Takahashi et al. | 524/321 |
| 5,653,915 | A | * | 8/1997 | Pardikes | 516/67 |
| 5,730,937 | A | * | 3/1998 | Pardikes | 422/62 |
| 6,207,719 | B1 | * | 3/2001 | Pardikes | 516/67 |

FOREIGN PATENT DOCUMENTS

| | | | |
|---|---|---|---|
| EP | 0 151 994 | * | 8/1985 |
| WO | WO 82/03797 | * | 11/1982 |

* cited by examiner

*Primary Examiner*—Daniel S. Metzmaier
(74) *Attorney, Agent, or Firm*—Laff, Whitesel & Saret, LTD (57) ABSTRACT

A continuous output system makes paper coating by combining an emulsifier with ASA particles having a mean average size in the low to sub-micron region. A turbine, pump, blender or other device exposes the ASA to a number of repeated episodes of high shear until the resulting ASA is in the form of particles having a mean average diameter in approximately the $1\mu$ range. The measure of the amount of high shear is identified by an energy factor index. A system for cooling the ASA enables the processing without causing a hydrolyzing of the ASA, even when a heated cooked emulsion is used.

48 Claims, 7 Drawing Sheets

MEANS FOR AND METHODS OF USING A SELECTED ENERGY FACTOR TO APPLY A PAPER COATING

This is a continuation-in-part of Ser. No. 09/136,677, filed Aug. 19, 1998, now U.S. Pat. No. 6,207,719.

This invention relates to means for and methods of using a selected energy factor to apply an ASA sizing or coating to paper and more particularly a system having means for preventing a build-up of ASA on inside surfaces of apparatus that is used to produce the sizing.

Reference is made to my U.S. Pat. No. 5,653,915 for more information on ASA coating systems. As good as it is, this system, like most paper coating systems, suffers from a build-up of ASA on inside surfaces of pipes, nozzles, valves, and other parts of the system. The build-up generally required a periodic back flushing and clean out every 2–4 months. With the invention, the time between this periodic back flushing can be extended many fold.

This build-up occurs because, when it is added to pulp stock during a paper making process, a hydrocarbon based ASA polymer material forms a protective barrier, resists moisture intrusion into the paper, and provides a conditioned surface for the application of inks to paper. Those same characteristics tend to form a similar barrier on the inside surfaces of the system pipes, vales, nozzles, etc.

Accordingly, a desired feature of the invention is to reduce the area of the inside surface, and in particular, to eliminate minute spaces where the build-up quickly forms and decreases the quality of the emulsion produced by the system. One such minute space is the atomizing nozzle which reduces the ASA to a spray of fine particles which may be thought of as tiny droplets of oil suspended in a liquid, such as water, for example. Heretofore, these particles have been formed by atomization, but the atomizer nozzles have tended to be clogged by the ASA. Another concern is the large amount of internal surface area presented by the plurality of inter-connecting pipings in contact with the ASA emulsion during the processing.

The quality of the ASA coating is largely dependent on the particle size of the colloidal droplets. Particle counters, particle size analyzers, and microscopes are available to estimate the particle size. While these tools are effective, they are also tedious and more importantly, intermittent, so that traditionally there has been no continuous monitoring of particle size during the production thereof. Therefore, samples had to be drawn from an emulsification unit and analyzed in a laboratory in order to determine particle size. With such an intermittent testing, any changes in the quality of the emulsion on-line would not be detected in time to prevent at least some poor sizing performance on the paper machines. My U.S. Pat. No. 5,730,937 describes a monitor and sensor which is able to continuously monitor a flowing stream for particle size and concentration, and to send control signals in response thereto.

ASA emulsions are stabilized either by cationic starches (a natural polymer) or by proprietary synthetic polymers or starch/polymers. Paper mills have their own and proprietary process and method of treating paper. As part of their process, the paper mill may elect to use either a cooked starch or a combination of starch and polymer as an emulsifier. The cooked starch is about 4% solids and is introduced into the processing system at a temperature in the nature of 100° F. Cooked starch does not have to be diluted with water, but it needs to be cooled to prevent a deterioration of the ASA. The combined starch/polymer is in the range of about 25–35% solids, but it is at a lower and usually ambient temperature. It does need to be diluted with water to reduce the ratio of solids to liquids, but it does not have to be cooled.

From the viewpoint of someone practicing this invention, the customer usually prescribes not only the surfactant to use along with an identification of the polymer to be processed, but also supplies a liquid with the surfactant already in the ASA. Regardless of whether a cationic starch or a synthetic polymer is used, an additional surfactant has been required in the emulsification step. The surfactant provides a boundary layer resistance to shear for the ASA particles. This surfactant is normally a non-ionic alkyl phenol ethoxylate. The composition of most surfactants is a trade secret which is closely held by the manufacturer, causing an increased uncertainty which makes the design of a general purpose system more difficult.

Since the user of my system must accept and process the prescribed blends, it must be versatile enough to work with virtually all blends. Accordingly, an important virtue of the inventive system is that it is so versatile that it may be used with almost all of the proprietary paper making process by making only slight modifications to the system.

Putting these thoughts together, a system has to impart enough energy to a blend of ASA emulsifier and surfactant to break it into very fine particles. My above identified patent supplies the energy by a combination of a nozzle, subject to clogging, and a high pressure pump. To eliminate the nozzle, another form of device must be provided to impart the energy. If, in the process of imparting such energy, a substantial cost savings can be realized, the system is even better. Since the nozzle and high pressure pump were among the more costly parts of my earlier system, improvements of the described type are highly desired.

In keeping with an aspect of the invention, the system uses any of various mechanically means to break-up the blend of ASA and surfactant into fine particles. These means involve devices such as turbines, blender and the like. The invention solves the problem of reducing the internal surface area of the system by drilling holes in a block of metal so that the bores of the holes perform the functions of a network of pipes. The longest of those bores is only a few inches. I have reduced the costs of the system by a factor of 40–50% as compared to the cost of prior art systems. Also, I have formed ways of making systems having a capacity in a range from very small to very large with only a small amount of system modification.

The term particle "size" refers to the average mean diameter/volume of the particles. Of course, the actual size of the particles will be distributed in a manner described by the well known Guassian or bell-shaped curve. Therefore, some particles will be larger and some smaller than the average cited in this specification.

The success of the sizing is directly related to the quality of the emulsion (ASA particle size). If the ASA colloidal particle size is not small enough, there is a less stable emulsion and a lower retention of the size. In general, the smaller the particles, the better, a useful average mean diameter range being about 0.1–3.0 microns, with a range of about 0.5–1.5 m preferred. A high level of size retention is mandatory in any ASA sizing system which means less re-circulation of ASA in a white water system and fewer problems associated with hydrolyzed ASA which occurs when ASA chemically reacts with water and which forms a gum-like particle called a "stickie". The conflict for the system designer is to make the particles as small as possible without degrading the molecules of the starch and causing the ASA to react with water. One of the reasons why smaller particle size is so important is that it does less damage to paper making machine which tend to gum up, if the particle size is too large.

Because the internal phase is made up of the ASA, the emulsion is classified as an oil in water ("O/W") emulsion. The two most common natural polymer emulsifiers (external phase) are corn and potato starch which are chemically modified to enhance their cationic charge characteristics. Another approach utilizes synthetic polymers in lieu of starch. The starch or polymer surrounds and protects the ASA thus encapsulating the ASA to keep it from hydrolyzing. In effect, the starch is the protective barrier for the particles of oil (ASA) to be spread on the paper. The "oil" is an internal coating which makes the paper water resistant and receptive to ink.

One consideration which goes into the design of my system involves a calculation of how much energy is required to produce the ASA particles having a desired particle size. In an exemplary mill application, the ASA and starch (or other suitable emulsifier) are metered through an emulsification unit designed to impart energy to the mixture to create a suitable and stable emulsion. The emulsion is then metered onto the paper. There the ASA emulsion combines with the furnish.

I have found that I can produce superior results with a mixing head costing under $1,000 and using standard commercial items, such as those shown in FIGS. 5–10. For example, a turbine that is useful with the invention may be almost any of those manufactured by MTH PUMPS of 401 West Main Street, Plano, Ill. 60545, although one of their turbines, may be preferred over other of their turbines for any given installation. To this mixing head, there must also be added the cost of controls, sensors, and the like. However, the cost for controlling these standard commercial products is generally less than the controls which must be designed for special equipment. I have found that in order to achieve a proper particle size with a good distribution, two things should happen. First, a proper number of shearing events should occur in an order of magnitude of at least about 150,000 shear events per minute. Second, the blade tip speed should be at least about 5000 feet per minute.

In order to quantify the number of shearing events for the emulsion, reference may be had to the following equations:

$$\text{(Number of Shearing Events/Minute)} \quad \frac{\text{(Velocity of Blade Tip Ft/Min)}}{1{,}000{,}000} \text{(Duration of Contact Time in Minutes)} \quad (1)$$

From the information published for various standard commercially available machines and by using Equation 1, the following table can be calculated:

TABLE 1

|  | Energy Factor |
| --- | --- |
| Standard Centrifugal Pump | 79 |
| Standard Turbine Pump | 361 |
| Laboratory Blender | 752 |
| High Speed Centrifugal | 138 |
| High Speed Turbine | 1020 |
| High Speed Stack Centrifugal Pump | 620 |

The "Energy Factor" is a dimensionless index which gives an indication of the efficiency of the various mixing machines. Table 1 shows that the standard centrifugal pump, the standard turbine pump, and the high speed centrifugal pump are not very good. The remainder of these mixing machines have an "energy factor" index in the range of 620–1020 which makes them acceptable. Depending on the choice of blade or impeller design and on the fixed rotational speed, the variable that comes into play is the duration of the contact time between the blade and the ASA. The maximum contact should not exceed 3 minutes. Any number below this three minute value is acceptable if it satisfies the required particle size. However, for most uses, with one exception, the optimal time has been found to be approximately one minute of contact time. The only exception found to date is the laboratory blender. Due to its combination of small blades and high rotational speed, about twenty seconds is usually adequate. If the duration of the contact time in the blender is in excess of one minute, there can be a latent heat buildup in the emulsion.

In greater detail, tests have shown a continuous improvement of ASA with a reduction of particle sizes. These tests have gone down to particle size having a diameter as small as about a quarter of a micron. Hence, the finer the particles, the better the reaction with the paper fibers. However, if the imparting of energy goes on too long, hydrolyzing may occur where there is a chemical reaction between the ASA and water. In this chemical reaction, heat acts as a catalyst. Therefore, there is a race against time between making particles as small as possible and the accumulation of enough heat to cause hydrolyzing.

The distribution and mean particle size of an exemplary ASA emulsion may be analyzed by a Honeywell particle size analyzer using laser refraction algorithms. The Microtrac (Honeywell) analyzer presently costs approximately $50,000, is calibrated to NIST standards, and is representative of particle size analyzers now used in the paper industry in order to track ASA performance. In this example of a particle size analysis, an ASA particle size (9.543 mv) is too large to be useful as a sizing agent. By increasing the energy value applied to the ASA, the mean particle size drops to about 1.355 mv, for example. Although the particle is smaller, the distribution (smallest to largest) is still too wide. The same ASA material may be brought into a suitable range with an additional fine tuning adjustments of the emulsifier (energy factor and contact time). While the mean particle size has remained virtually the same, the distribution of particle sizes has significantly narrowed with a much more desirable profile with respect to sizing performance on the paper machine.

To make smaller particles, the invention in general depends upon an imparted energy factor which, in turn, depends upon a number of different parameters: the number of blades on an impeller, number of impellers, revolutions per minute, and duration of the exposure of ASA to the shearing events. Any one or more of these factors may be varied so that there is a trade-off between the parameters. The limiting factor on the upper end of an imparting of high energy is the heat generated by the impeller operation. If the energization of the fluid makes it too hot, the ASA becomes unstable. Also, the heat may degrade the starch or other emulsifier.

This suggests that parameters other than the impeller and rotations per minutes may also play important roles in the preparation of ASA. For example, the ASA, water, and emulsifier may be introduced into the system at, say 33° F. or 120° F., or any other temperature. (Obviously, more shearing events, or energy input, may occur when the inflowing streams are cold than when they are hot). Also, the entire system or parts thereof may be cooled to enable an imparting of more shearing events especially when the inflowing liquids are hot. For example, to cool the processed fluids, the entire system may be housed in a temperature controlled environment, such as a cooling housing; or, the recycle loop may be run through a heat exchanger such as a plate and frame heat exchanger, a tube heat exchanger, a heat sink having cooling fins, a radiator, or a combination thereof.

Another way of controlling the heat is to control the volume of fluids introduced into the processing system. For example, in a super simplistic way, a gallon of water energized for one minute might accumulate twice as much heat as two gallons of water energized for one minute.

A moment of thought will suggest many other ways of controlling the amount of heat build-up in the processing system as energy is imparted to the ASA.

Using a preferred range of one minute of contact time, we can compare the prior art to the invention, as follows:

PRIOR ART

Standard turbine with a 29-blade, four inch impeller, turning at 3450 RPM. To calculate the blade tip velocity (V) in Ft/Min $$V = \frac{2\pi r(RPM)}{12} \quad (2)$$

where r=radius of impeller $$V = \frac{2(3.14)(2)(3450)}{12} = 3611 \text{ ft/min}$$

To Calculate Shear Events/Min:

(Number of blades)×(number of impellers)×(Revs per minute)
29×1×3450=100,050    (3)

To Determine the Energy Factor:

$$\frac{(\text{Shearing events/min})(V)(\text{duration of contact in min})}{1,000,000} \quad (4)$$

$$\frac{(100050)(3611)(1)}{1000000} = 361$$

According to the teaching of the invention over the prior art, we now see that:
High speed turbine at 5800 RPM with a 29-bladed impeller of 4" diameter $$V = \frac{2(314)(2)(5800)}{12} = 6070$$

Shear Events/Min (Number of blades)(number of impellers)(Revs per minute)
(29)(1)(5800)=168200 shear events/min    (5)

Energy Factor $$\frac{(\text{Shear Events/Min})(V)(\text{Duration of Contact in Minutes})}{1,000,000} \quad (6)$$

This example shows that the energy factor has increased (361 vs. 1021) substantially over the prior art for the same duration of the emulsion contact time. This 2.8 times increase $$\frac{1021}{361} = 2.8$$

Improves the efficiency of the emulsification unit, resulting in improved particle size and distribution.
Calculations
To calculate Blade Tip Velocity $$V = \frac{2\pi r \times RPM}{12} \quad (7)$$

where:
r=radius of shearing blade or impeller in inches
RPM=speed of blade in revolutions/minute
V=Velocity expressed as ft/minute
To Calculate Shearing Events/Minute $$B \times N \times RPM = SPM \quad (8)$$

where:
B=number of blades
N=number of stacks or impellers
RPM=revolutions/min
SPM=shearing events/min
To Calculate Shearing Factor $$V(t) = SF \quad (9)$$

where:
t=time of exposure to shearing blades in minutes
V=shearing velocity
Examples of Shearing Factor
High Speed Turbine
Diameter of impeller=4 inches
Number of blades=29
Number of stacks=1
RPM=5800
Duration of Exposure time=1 min.
From Equation (7):

$$V = \frac{2\pi 2(5800)}{12} = 6070$$

V=6070
SF=6070×1=6070
High Speed Blender
Diameter of impeller=2 inches
Number of blades=4
Number of stacks=1
RPM=33,000
Duration of Exposure Time in Minutes=0.66 min
(From Equation (7))

$$V = \frac{2\pi r l(33,000)}{12} = 17270$$

V=17270
SF=17270×0.33=5699
High Speed Centrifugal
Diameter of impeller=5 inches
Number of blades=5
Number of stacks=1
RPM=4600
Duration of Exposure Time=1 min From Equation (7)

$$V = \frac{2\pi 2.5(4600)}{12} = 6018$$

Using "29" blades with (3) minutes of contact, the energy factor becomes:

(29) No. of blades×(1) No. of impellers×(5800) rpm=168, 200 shear events/min $$\frac{(168,200)\text{shear events/min} \times (6070) \text{velocity ft/min} \times (3) \text{contact in minutes}}{1,000,000} = 3063/\text{factor}$$

This represents a threefold increase over the original example of a 1020/factor using 1 minute of contact time. However, the target energy factor is 5623 based on the actual contact time and the number of turbine blades on he MTH pump. Since the MTH pump has blades on each side, the there is a doubling of the number of blades due to their staggered arrangement on opposite sides of the turbine. This makes the number of blades jump from 29 to 58, giving the following results:

(58) No. of blades×(1) No. of impellers×(5800) rpm=336, 400 shear events/min $$\frac{(336,400)\text{shear events/min} \times (6070) \text{velocity ft/min} \times (3) \text{contact in minutes}}{1,000,000} = \begin{matrix} 6,126/\text{factor} \\ \text{for three} \\ \text{minutes} \end{matrix}$$

Calculation for 160-blade Turbine

Shear events per minute:

(Number of Blades 160)(Number of impellers 1)(Revs per Minute 5800) (160)(1)(5800)=928,000 shear events per minute In the next step, calculating the energy factor, substituting 928,000 SPM for 168,200 SPM in Equation 5 yields:

(Shear Events/Min 928,000)(V6070)(Duration of Contact in Minutes 1)

$$\frac{(928,000)(6070)(1)}{1,000,000} = 5632 \quad \text{Energy Factor}$$

However, for the example of 160 blades (blade count on the MTH turbine actually used), the energy factor for 3 minutes would be calculated thus:

(160 N. blades×(1) No. of impellers×(5800) rpm=928,000 shear events/min $$\frac{(928,000)\text{shear events/min} \times (6070) \text{velocity ft/min} \times (3) \text{contact in minutes}}{1,000,000} = 16,899/\text{factor}$$

TABLE 2

| RPM | | Blade Tip Speed | Duration in Minutes of Contact Time |
|---|---|---|---|
| 3450 | Centrifugal | 4513 | 1 |
| 3450 | Turbine | 3611 | 1 |
| 33,000 | Blender | 17270 | .33 |
| 4600 | H.S. Centrifugal | 6018 | 1 |
| 5800 | High Speed Turbine | 6070 | 1 |

When the mechanism of particle size retention is not fully understood, it is thought that once established, a very small particle size tends to form a better distribution in the emulsion. However, it also seems that, after the small particles are formed, and if they do not have time to stabilize some of them may attract each other so that they come together again, thus clumping and reforming into big particles. These bigger particles can adversely affect the mechanical properties of the coating.

BRIEF DESCRIPTION OF DRAWINGS

A preferred embodiment of the invention is shown in the attached drawings, in which:

FIG. 1 is a block diagram of my relatively simple prior art system for activating or inverting polymer;

FIG. 2 is a manifold block for use in the system of FIG. 1;

FIGS. 3–4 are two views of a static mixer comprising an end view, and a side elevation;

FIG. 5 is a plan view showing the front of a turbine for imparting energy to the ASA;

FIG. 6 is a schematic view of a pump impeller for imparting energy to the ASA;

FIG. 7 is a schematic view of a vertical stack centrifugal pump;

FIG. 8 is a schematic view of a blender for imparting energy to the ASA; and FIGS. 9 and 10 are two schematic views showing ways of modifying blades for increasing the opportunity for ASA to encounter shear events;

FIG. 11 is a schematic diagram of the inventive system;

FIGS. 12–15 are four views of an inventive manifold block for replacing the ASA/polymer transportation and delivery system of FIG. 11, FIG. 12 being a top plan view, FIG. 13 being at left, elevation view, FIG. 14 being a front elevation view, and FIG. 15 being a right end elevation view;

FIG. 16 is a fragment of FIG. 11 showing an important part of the system in a temperature controlled enclosure to prevent or control heat build-up during the energization of the ASA;

FIG. 17 is another fragment of FIG. 11 also showing an important part of the system using a heat exchanger in the recycle loop;

FIG. 18 is a modified copy of FIG. 11 which provides details of details of a heat exchanger used to cool cooked starch and the recycled ASA/Emulsion blend being processed; and FIG. 19 is another modification of FIG. 11 showing an embodiment which reduces the need for expensive control valves.

An early form of a mixing manifold is shown in FIGS. 1–4 taken from my U.S. Pat. No. 5,372,421, which use the conventional network of pipes forming the delivery and transport system which conveys the ASA. The invention uses a mixing manifold block to reduce the inside surface area of the network of pipes.

Figure 1:
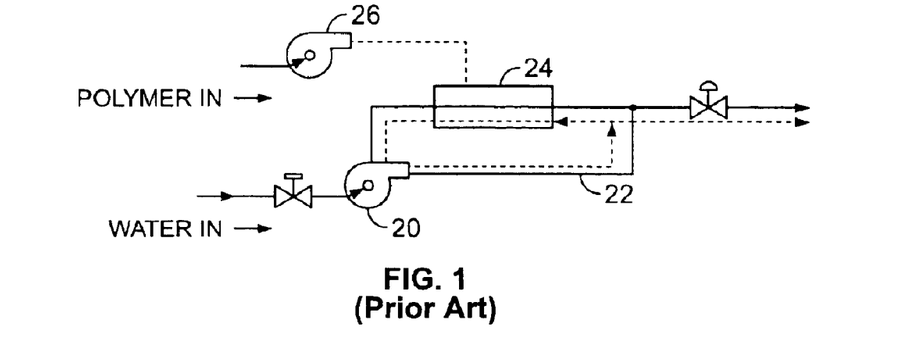

In FIG. 1, the polymer inverting and activating system components are a centrifugal pump 20 for introducing water, a closed mixing loop 22, mixing manifold 24, and a centrifugal pump 26 for introducing the polymer in to the manifold. The water and polymer first meet in the mixing manifold 24, the water flow being indicated in FIG. 1 by solid lines and the polymer flow being indicated by dashed lines.

In greater detail, the mixing manifold 24 (FIG. 2) is, for example, a solid block of metal having a central bore 28 extending through substantially its entire length. The bore stops short of counter bored and threaded input opening 30, to form a bulkhead 32. An orifice 34 of a selected diameter is formed in the center of the bulkhead 32 to establish communication between the water inlet hole 30 and the central bore 28, with a flow rate that is controlled by the orifice diameter. The polymer solution experiences an extrusion type of shear as it passes through the orifice 34.

Figure 2:
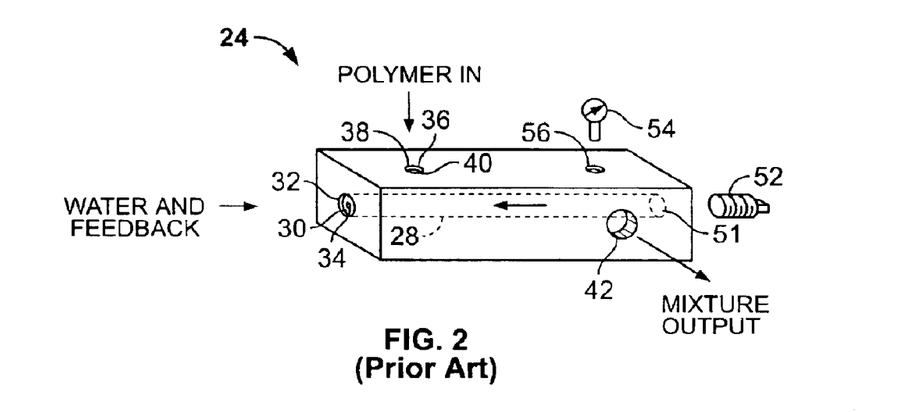

A first threaded hole 36 leads to another bulk head 38 between the entrance to the counter bored and hole 36, and the central bore 28. An orifice 40 is formed in the bulkhead 38 to establish communication and to control the flow rate between the hole 36 and the central bore 28.

The output port 42 is in direct communication with the central bore 28 to give an unimpeded outflow comprising a mixture of polymer and water.

Figure 3:
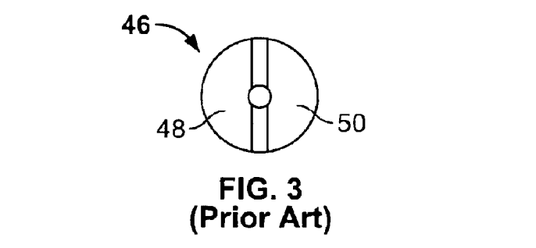
Figure 4:
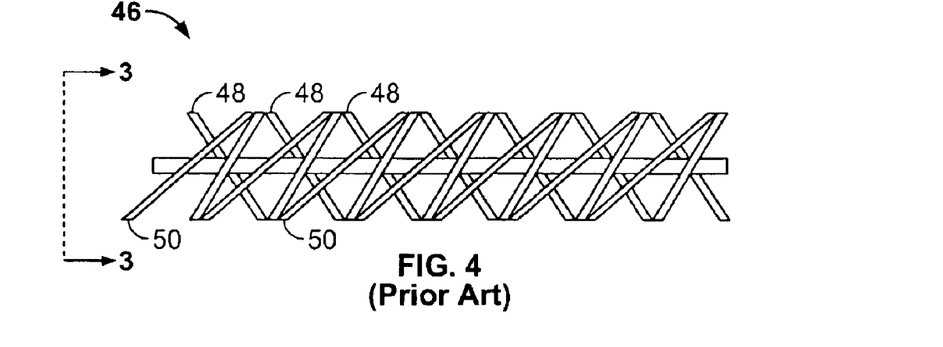

A static mixer 46 (FIGS. 3 & 4) comprises two sets of semi-elliptical baffles which are set at an angle with respect to each other so that the overall end view configuration is a circle (FIG. 3) which corresponds to the inside diameter of the central bore 28. Therefore, the static mixer 46 slides through an end opening 51 and into the bore 28. The baffles 48 on one side of the static mixer are a series of spaced parallel plates. The baffles 50 on the other side of the static mixer are joined on alternate ends to give an overall zigzag appearance. A plug 52 seals off the end of the bore. A gauge shown at 54 fits into a hole 56 that is in communication with bore 28.

An inspection of my ASA U.S. Pat. No. 5,653,915 reveals a manifold having a nozzle at the ASA inlet. This is the relatively expensive atomizing nozzle which, like most nozzles for ASA, is subject to clogging after a relatively short period of use. An elimination of this nozzle simplifies the system, reduces the cost thereof, and eliminates a source of relatively early clogging. However, before eliminating the nozzle, some other means is required for imparting enough energy to break the ASA into tiny particles. For a description of such means for imparting energy, reference may be made to FIGS. 5–10, as examples of various means for reducing ASA to the particle size.

Figure 5:
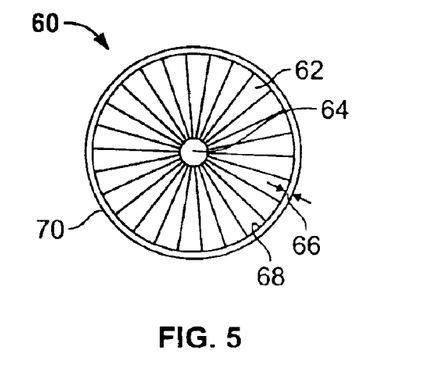

FIG. 5 shows the front of a turbine 60 having a multi-blade rotor 62 turning about a shaft 64 in a housing 70. The ASA passes from one side of the turbine through the blades and out the other side. The collisions between the ASA and the blades are the shear events which form the particles. There is an extremely small clearance 66 between the tips 68 of the turbine blades and the surrounding housing 70 so that very little of the ASA which has passed through the blades feeds back to the input side of the turbine.

Figure 6:
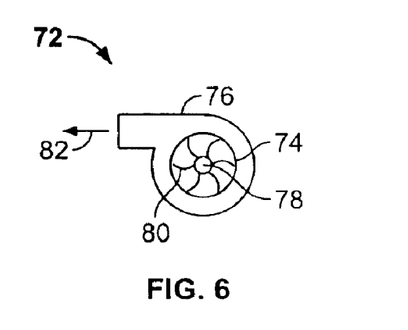

FIG. 6 schematically shows a pump 72 having an impeller 74 mounted to rotate within a housing 76. The ASA material which is to be broken into particles falls into an eye 78 of the impeller from which it is flung out by centrifugal force. All of the ASA will be struck by the blades 80. Much of the ASA will strike the housing 76. A good portion of the ASA will feed back into the blades and be struck repeatedly. Each of these encounters imparts some shear and breaks the particle in order to reduce their size. A portion of the ASA will leave the housing at 82.

Figure 7:
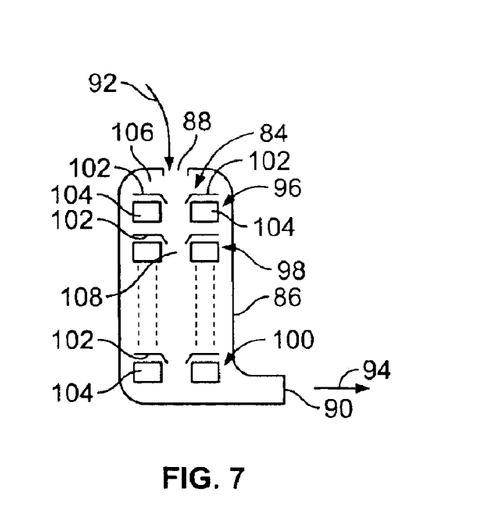

FIG. 7 schematically shows a stack 84 of centrifugal impellers which are enclosed with in a common housing 86, which are mounted to turn on a common shaft. The housing has an inlet 88 and an outlet 90 for ASA to enter, at 92 and leave at 94. Inside the housing, there are any suitable number of impellers 96–100 mounted to turn as a unit. Each impeller has a scroll plate 102 which turns with its individually associated blade 104.

As the ASA 92 enters the housing inlet at 88, it encounters and passes through an eye 106 in the scroll plate 102. The rotation of the impeller causes the ASA to emerge from stage 96 with a certain pressure. The design of the successive impeller stages 96, 98 . . . 100 is such that the pressure at the eye of the next successive eye (such as 108) sucks the ASA from the preceding stage. Thus, the ASA 92 enters eye 106 on the scroll plate 102 of stage 96, passes through the impeller blades 104 and is sucked into eye 108 on the scroll plate of the next succeeding stage 98.

In a similar manner, the ASA passes from stage to stage until it reaches the last stage 100 where the centrifugal force of the impeller flings the processed ASA 94 out the exit 90.

Figure 8:
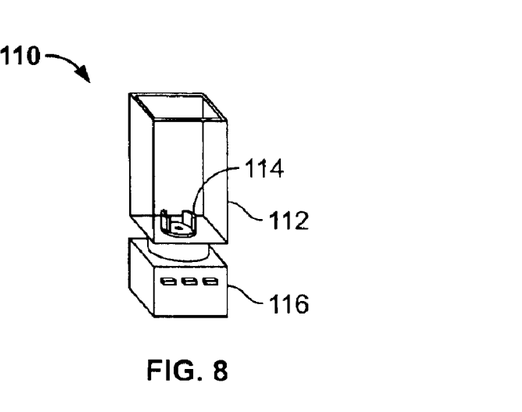

FIG. 8 schematically shows a blender 110 having a container 112 for receiving the ASA. In the bottom of the container, a number of blades 114 are mounted for rotary motion, driven from a motor in the base 116.

I have found that blenders work very well, although not as well as turbines. A blender, for example, has almost nothing to separate the material that has and the material that has not experienced shear.

Stated another way, a turbine with only a very little feedback which produces, say, 10,000 opportunities for shear during a given time period is not completely matched by a blender which produces the same 10,000 opportunities. However, the blender produces particles that are almost as good as the particles produced by a turbine. The "energy factor" index (752) for a blender may be better than the index for some high speed turbines with small clearance and little feedback; however, there is as much reason to believe that this may be due to the many turbine blades as it is to believe that it is due to the small clearance. Hence it is clear that the number of shearing events is more important than the prevention of feedback or the other factors thought to be important by the prior art. Because it has mechanical limitation, the blender is best when limited to a use within a laboratory environment. There are trade-offs considering the low cost of the blender, the size of the system and a possibly short life time of the blender.

Figure 9:
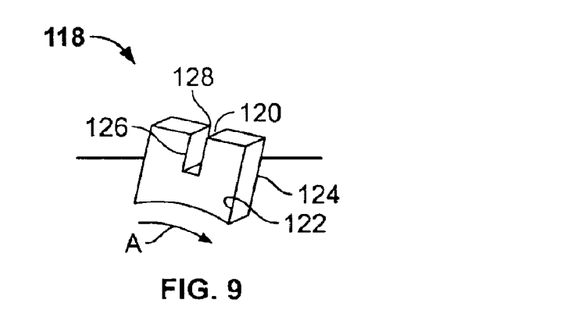
Figure 10:
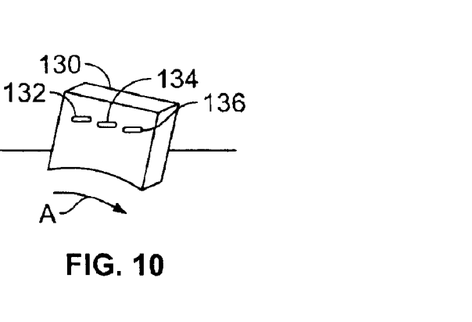

FIGS. 9 and 10 are examples of how the blades of any of these devices may be modified to create more shear events without increasing either the speed of rotation or the number of blades. For example, in FIG. 9, the blade 118 has a notch 120 cut into it so that, if rotating in direction A, the number of sharp edges (122–128) striking the ASA has been doubled over the number of edges on a blade without a notch. In FIG. 10, the blade 130 has three pegs 132, 134, 136 projecting from each side. As the blade rotates, each of these pegs strikes the ASA to add shearing events. Of course, these two examples are given merely to illustrate a principle. Many different modifications of the blades are possible.

Figure 11:
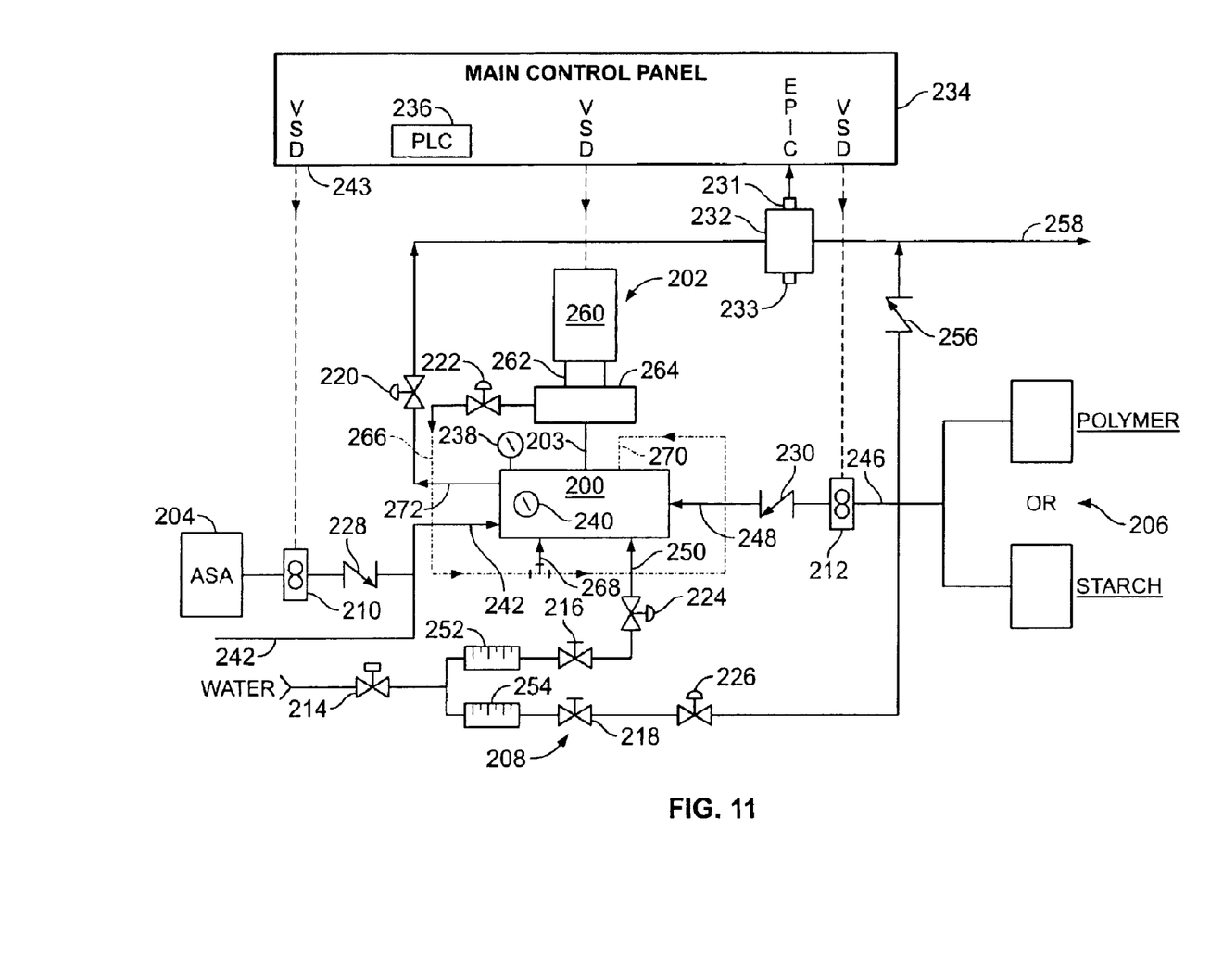
Figure 12:
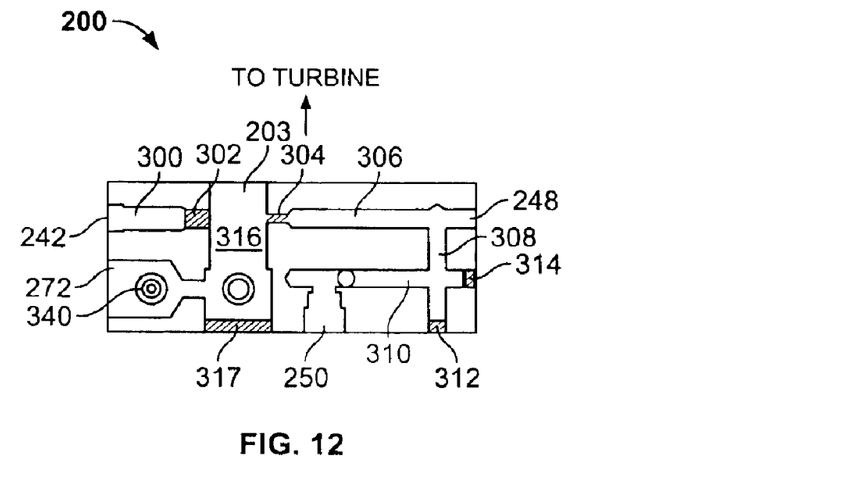
Figure 13:
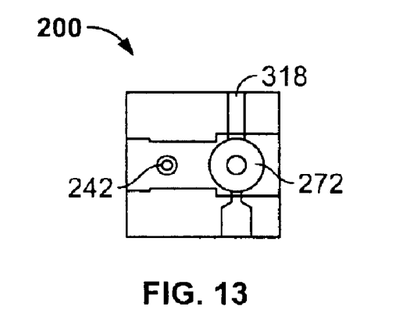

The inventive system is schematically shown in FIG. 11 which uses the principles described above. The principal parts are a manifold 200, a turbine 202, a source of ASA 204, a source of polymer 206 (either starch or synthetic), flow meters 208, gear pumps 210, 212, throttle valves, as 214, 216, 218, pressure controllers 220, 222, flow controllers, 224, 226, check valves 228, 230, an EPIC sensor and monitor system 232, and a control panel 234 including a programmable logic controller ("PLC") micro-processor 236. Pressure gauges are shown at 238, 240.

The inventive system (FIG. 11) has a suitable tank 204 which stores the ASA, usually pre-blended with a surfactant in the range of 0.5–4% by weight of the total blend. If desired, the tank 204 may include only ASA, while the surfactant is separately introduced at 242. A suitable gear pump 210 delivers the mixture through a suitable strainer, such as a 100-mesh strainer. Pump 210 provides a positive head in the range of 10–60 psi, which flows through check valve 228 to input 242 on manifold 200. A pressure gauge 240 gives a continuous reading of the ASA pressure in the manifold 200.

The speed of pump 210 is controlled by the programmable logic circuit 236, preferably in the form of a microprocessor, via a variable speed terminal 243. The output of pump 210 may be in the range of 100–200 psi with 40–60 psi preferred. A check valve 228 passes the ASA in the direction of the arrow (i.e. toward the manifold 200 ) and prevents a back flow from the starch/polymer line which would contaminate the pristine ASA mixture.

The starch/polymer is transmitted under the pressure of pump 212 from any suitable source 206 via a line 246 and check valve 230 to manifold input 248. The starch/polymer pump 212 delivers the starch/polymer at a rate in the order of 0–10 gpm, for most systems. Obviously, a different volume may be used in other systems.

An electrolyte, herein a form of water, is introduced into the manifold via throttle valve 214 and flow meters 208, a primary dilution water path may be traced through throttle valve 216, and flow regulator 224 to manifold inlet 250. This primary dilution brings the ASA and starch/polymer to a desired consistency. A secondary dilution electrolyte path is traced through flow meter 254, throttle valve 218, flow regulator 226 and check valve 256 to the output 258. The secondary dilution path provides enough water to fine tune and brings the final output to a desired consistency.

As here shown, turbine 202 includes a motor 260 coupled through a shaft 262 to a turbine 264 constructed somewhat as shown in FIG. 5. Depending upon the needs of the system, any of the devices of FIGS. 5–10 may be used; a pump made by the MTH Company of Plano, Ill. is preferred. The ASA/polymer/water mixture enters the manifold 200 at entrance 203. The turbine 264 imparts enough energy to break the ASA into tiny particles of a desired size with a recycle out flow over a path 266 shown by a dot-dashed line. Recycle is controlled by flow regulator 222. The recycle out flow divides, part going back into the manifold 200 at entrance 268 and part entering manifold 200 at entrance 270.

A relatively small percentage of the mixture exits the manifold 200 at outlet 272 and travels through flow regulator 220 and sensor 232 to the system output at 258.

Control means are provided for enabling a continuous testing of particles during a production run. Primarily, the prior art used non-continuous sampling as their only available means to verify the quality of the emulsion. At monitor and sensor 232, the inventive system provides the EPIC (Enhanced Polymer Imaging Controller) of U.S. Pat. No. 5,323,017 to continuously monitor the quality of the emulsion. Briefly, this patent discloses a source 233 of preferably laser light shining through a flowing output stream of an ASA emulsion. The light from source 233 is sensed at 231 and a signal is sent to control panel 234 in response thereto. Hence, the EPIC controller uses a laser supplied light to apply a combination of light scatter and absorption principles to establish a spatial distribution of ASA and polymer composites which accurately corresponds to particle size and particle concentration. This sensor detects instantaneous changes in the ASA particle size concentration, which can be used to control the system and can be displayed (not shown) at a main control panel 234. This sensor is manufactured by Norchem Industries of Tinley Park, Ill.

Because the sensor 232 scans the emulsion with coherent (laser) light and monitors only selective wavelength it can be fine tuned to look for particles within a specific refractive index in an extremely narrow bandwidth (5–20) nm). Also, because the refractive index of a substance which is varied for different wavelengths, conventional light scattering instruments are not always as reliable. Unlike turbidity meters or nephelometers which use a white light from a thermal radiation source, the laser eliminates all refractive index differences for all the wavelengths except those emanating from the source. All that remains to affect the light scatter, is the particle size, shape (distribution), and concentration.

One of the problems is that the buyer of the inventive system does not know in advance exactly what component material will be processed during the lifetime of the system. For example, the starch/polymer may be made from any of many different raw material. There are a number of different ASA's with a great variety of molecular weights or other wide variances. There are thought to be thousands of different surfactants, each with its own particular characteristics. The EPIC controllers helps to overcome the resulting problems.

The sensor 232 reads the consistency of the output, primarily the size of the particles. The programmable logic controller (PLC) in the microprocessor responds thereto by adjusting the variable speed drive signals (VSD) sent to pumps 210, 212 and to turbine 202, which brings the system into a finely tuned operation.

The internal construction of the manifold 200 is shown in FIGS. 12–15.

In greater detail, FIGS. 12–15 are schematic or graphic presentations showing how the holes are drilled into metal block 200 in order to form the manifold. When viewed from the outside, the metal block 200 appears as having solid sides with only the entrances of the various holes visible. The phantom lines shown within rectangles in FIGS. 12–15 schematically indicate the paths formed by the bores inside the block.

The output of ASA pump 210 is connected to inlet port 242 which is the entrance to a relatively large diameter bore 300 that terminates at its bottom in a bulkhead containing a relatively small diameter hole filled by a plug 302 which has an orifice formed therein. In order to adapt the system to different processing materials and techniques, ASA, surfactants, etc. the plug 302 may be replaced by another plug having a different orifice size.

Any suitable starch/polymer may be inserted into the block 200 via inlet port 248 which communicates with bores 306, 308. Again, a small diameter hole is formed at 310 in the bottom of this bore 306 extending from port 302 contains a plug 304 with a mixture of starch/polymer.

Water is introduced at inlet port 250. A flow control orifice is housed inside of this bore. The ASA, starch/polymer, and water meet at mixing chamber 316. Bore 308 is closed by plugs 312 and 314.

Depending upon the needs of the system, static mixers (FIGS. 3 and 4) may be inserted into either or both of the bores 306 and 310. Then, the end of either of the bores may be closed by plugs, as may be required by specific system needs. For example, the transverse bore 308 is here shown as being plugged at port 312 and bore 310 is shown as being plugged 314. In other embodiments, the plugs may be removed and suitable connections may be made to insert a fluid into these holes.

After the ASA, water, and polymer meet and mix in a central mixing chamber 316, closed by plug 317 the resulting mixture is discharged from the mixing chamber at output port 203, to the inlet of the turbine pump.

Figure 14:
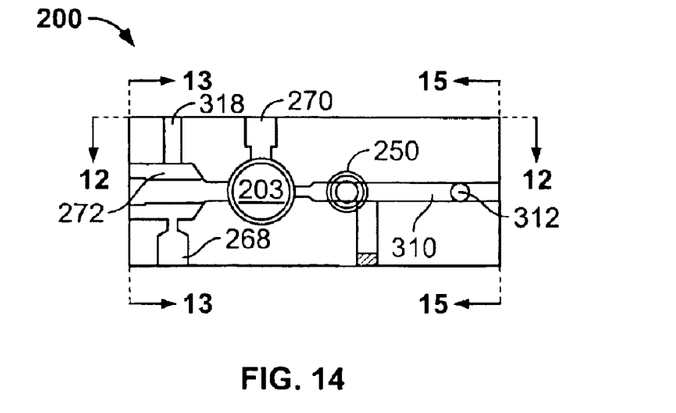
Figure 15:
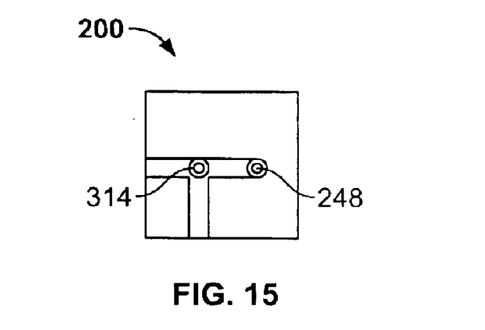

The system bleeds off some portion of the emulsion of ASA and starch as a discharge from turbine 264 and another portion is recirculated via a loop shown by the dot-dashed line in FIG. 11. The recycled emulsion reenters manifold 200 via holes 268 and 270 (FIG. 14). This resulting mixture is an emulsion which is discharged from the mixing chamber at output port 272 as the output product of the system.

Any of the various bores which are not used may also be capped by a plug, some plugs having a suitable meter associated therewith. For example, a pressure gauge 238, 240 (FIG. 11) may be associated with plugs closing port 318 and 240.

It should now be apparent that most of the pipes used in prior systems have been eliminated and that short bores inside the mixing manifold block 200 have been substituted therefore. Since the adverse effects resulting from a hydrolyzed ASA build-up varies directly with the area of the inside surfaces of passage ways carrying the ASA, the invention sharply reduces the problems growing out of the ASA build-up.

Figure 16:
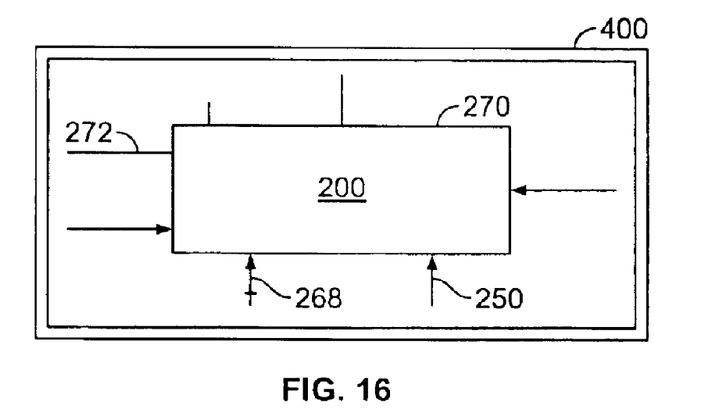

FIG. 16 shows manifold 200 and some of the inputs thereto. At least the manifold 200, and perhaps other equipment, is enclosed in a temperature controlled enclosure 400, such as a cooling housing. This enclosure will keep the enclosed parts of the system cool to avoid a possible hydrolyzing of the ASA which occurs when enough heat builds up in the processed fluid. This cooling is especially relevant when hot cooked starch is used as the emulsifier.

Normally, it is enough to merely place the manifold in a temperature controlled enclosure 400. However, it is also within the scope of the invention to so incorporate any or all other system components in the enclosure. Also, while the temperature controlled enclosure is here suggested as a cooling housing, it is within the scope of the invention to provide any temperature controlled enclosure which provides any suitable temperature profile during the ASA processing. In general, regardless of the temperature or temperature profile that is selected, the principle is to prevent a hydrolyzation or other loss or deterioration of the ASA.

Figure 17:
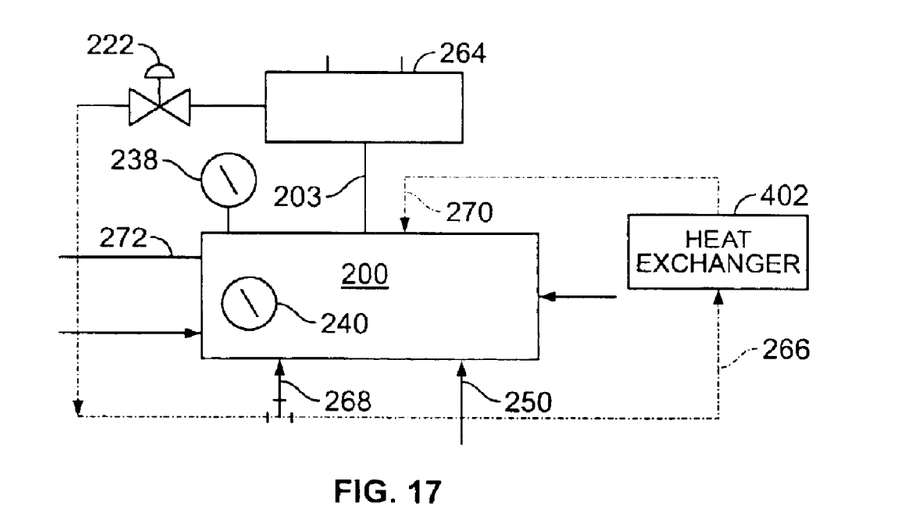

FIG. 17 broadly shows another approach to heat control in the inventive ASA processing system. Here shown is essentially the same part of the system that is shown in FIG. 16. However, instead of a temperature controlled enclosure, a heat exchanger 402 is included in the feed back loop (dot-dashed line 266 ) from pressure controller 222 to recycle import 270 on manifold 200. The heat exchanger 402 may take any of many different forms such as a plate and frame heat exchanger, a tube heat exchanger, a heat sink having cooling fins, a radiator, a combination thereof, or another suitable device.

Again, the purpose of the heat exchanger is to maintain a temperature profile which will prevent hydrolyzation or another deterioration of the ASA. The heat exchanger may also be used in combination with other devices, such as the temperature controlled enclosure 400 of FIG. 16, in order to control the temperature of the input streams of ASA, water, or emulsifier.

Figure 18:
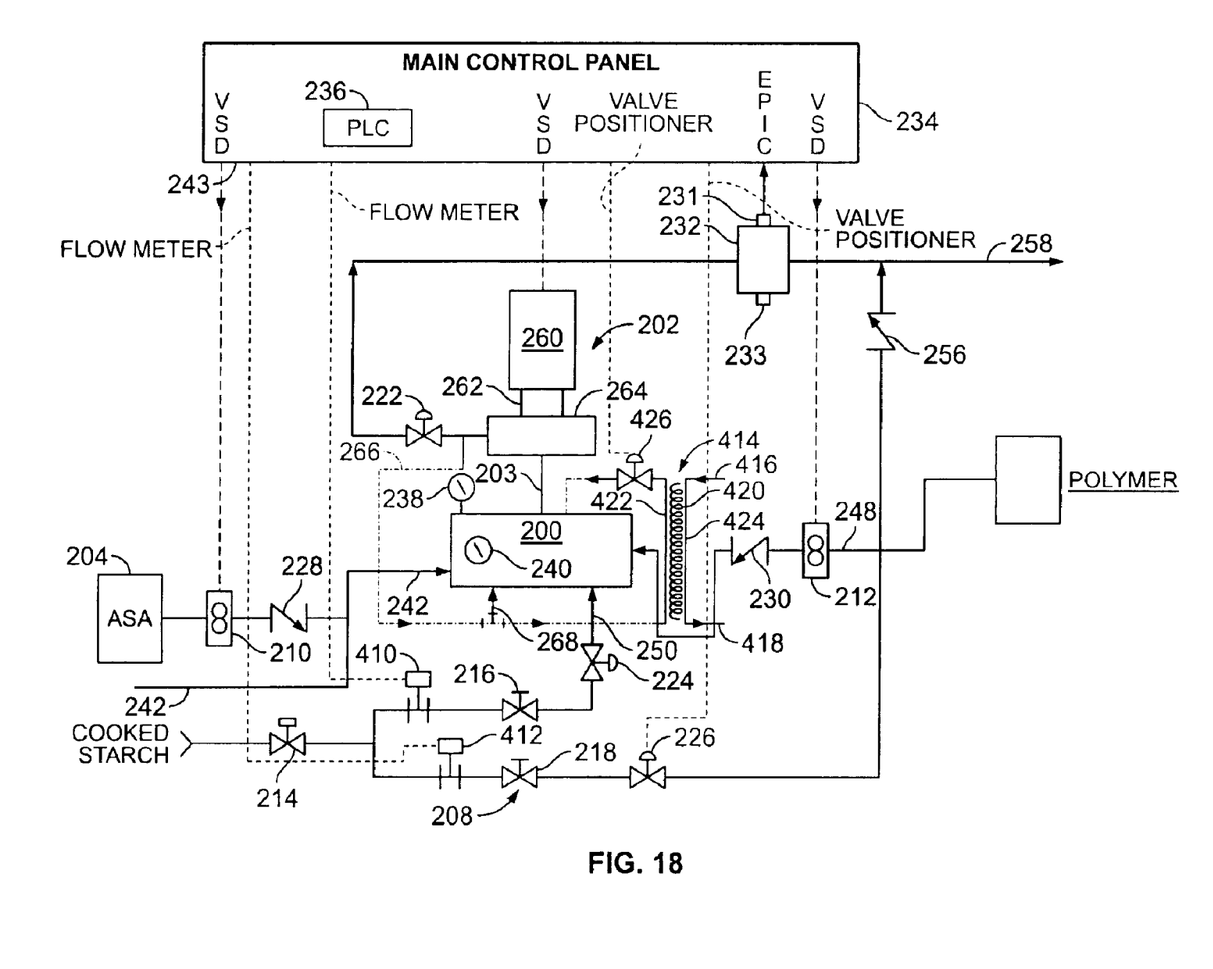
Figure 19:
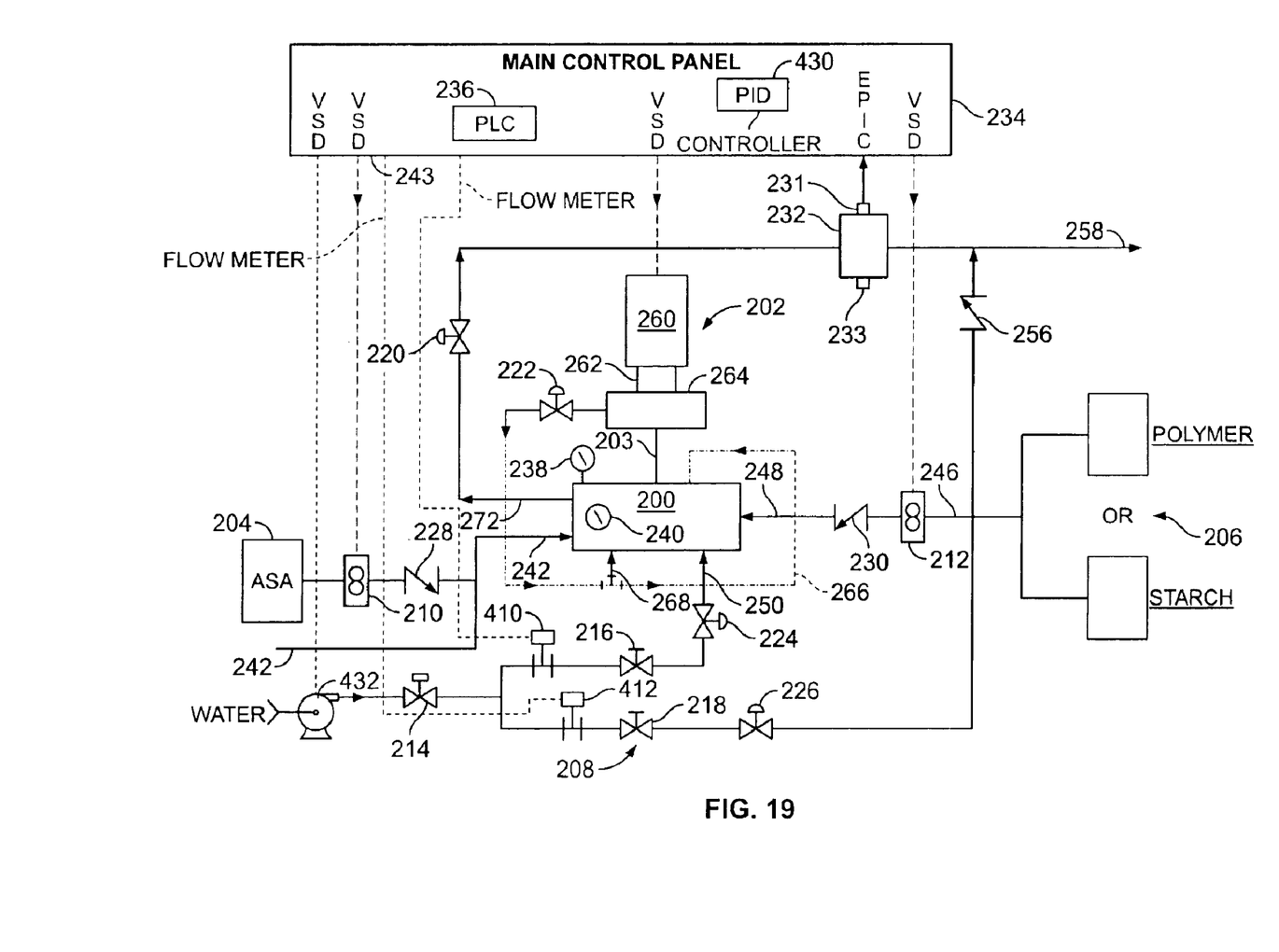

FIGS. 18 and 19 are substantially the same, but modified, system that is also shown in FIG. 11. Therefore, the same reference numerals are retained in these figures for corresponding parts. The description of these parts will not be repeated here.

The object of the modified system shown in FIG. 18 is (1) to prevent or reduce the chances of hydrolyzation or other damage to ASA when there is a high temperature either caused by the energy imparted by the turbine or caused by a use of hot cooked starch, and (2) to insure accuracy in the delivery of processed ASA to a paper machine under changing back pressure conditions.

It should be noted that the input emulsion material at valve 214 is hot cooked starch which will be at a temperature specified by the paper mill as part of its proprietary process. Usually, the temperature will be some temperature around 160° F. Therefore, if no cooling is provided either the subsequently processed ASA particles might be relatively large or possibly it might be hydrolyzed. If the ASA particles are too large, or are hydrolyzed, they will not interact satisfactorily with most paper fibers.

The FIG. 18 system modification to the FIG. 11 system includes a replacement of manual direct view flow meters 252, 254 (FIG. 11) with more accurate analog flow meters 410, 412, which may be connected to accurately report the input flow of starch at 214 to the main control panel 234. Since cooked starch is used, it will have only about 4% solids and, therefore, will not require water dilution. Responsive thereto, the PLC microprocessor controls the valve 426 in the secondary flow circuit. The cooked starch input valve 224 is self-controlling.

A heat exchanger 414 uses cold water which is externally supplied at 416, 418 in order to cool the processed fluid in the recycle loop 266, shown as a dot-dashed line. The cold water is circulated through a coil 420 associated with cooling and cooled lines 422, 424. As a result of this cooling, the ASA may be reduced to ultrafine particles without an undue heat build-up that might otherwise cause heat damage or a rapid hydrolyzation. This cooling is particularly important when hot cooked starch is provided at inlet valve 214.

With the modification shown in FIG. 18, there is no need for the valve 220 (FIG. 11) leading to the secondary flow line; therefore, it has been eliminated. The hole in manifold 200 which had been connected to the outlet pipe at 272 is simply plugged. The out flow from valve 222 is sent from turbine 264 directly through valve 222 to the secondary leg and the Epic sensor 232 to the output 258.

The recycle stream 266 (shown by a dot-dashed line) is taken directly from the turbine 264 and before passing through valve 222, which may create a back pressure applied to the recycle loop. A PLC controlled valve 426 is provided to control the primary flow rate in the recycle loop.

The advantages of the various modification disclosed in FIG. 18 should now be clear. The inventive system may be connected directly to an automatic in-line paper making machine. The emulsifier feed stream may be either a hot cooked starch polymer, or a starch/polymer combination. The programmable logic controller of a microprocessor 236 controls automatic valves at check points to insure an accurate delivery of processed ASA despite changing conditions which may occur in the inflowing starch and particularly changing back pressure conditions in the process line.

FIG. 19 shows another modification of the system of FIG. 11 which is designed to reduce cost by eliminating some of the more expensive control valves.

The modification of FIG. 11 that is shown in FIG. 19 included a proportional integral derivative ("PID") control 430, which is described in U.S. Pat. No. 5,730,937. The PID controller 430 maintains the flow rates in both the primary and secondary streams. The modification of FIG. 19 includes the use of analog flow meters 410, 412, as shown in FIG. 18. These flow meters report the incoming flow rates to the programmable logic control circuit 236.

The main control panel receives and responds to these reports and to the signals from the various sensors by sending control signals to a variable speed water pump 432 which increases or decreases the amount of water being delivered to the system. This controls the amount of dilution water supplied to input 250 of the manifold 200 and to the system output 258 via check valve 256. With this control over the water pump 432, it is possible to greatly reduce the precision of control at many other points in the system and, therefore, the cost thereof, especially the cost of expensive automatic control valves.

Those who are skilled in the art will readily preview how to modify the invention. Therefore, the appended claims are to be construed to cover all equivalent structure which fall within the true scope and spirit of the invention.

What is claimed:

1. A method of preparing an alkaline size, alkenyl succinic anhydride ("ASA") in an emulsion, said method comprising the steps of:
   A. supplying a liquid including at least ASA;
   B. feeding a portion of said liquid of step (A) to a first input of a manifold;
   C. feeding a first stream of emulsifier into a second input to said manifold, said liquid combining with said emulsifier within said manifold to form a second stream comprising a mixture of at least ASA and said emulsifier;
   D. feeding the second stream of step (C) through a mixing means which imparts energy to break down said ASA into particles and form an emulsion;
   E. dividing an outflow from said mixing means (i) through a recycling loop to at least a third input of said manifold to recycle said emulsion and (ii) to an output stream of said system, said output stream having a ratio of ASA to emulsifier set by the relative volumes of said streams of Step (C); and
   F. feeding said recycled emulsion of step (Ei) into said mixing means of step (D).

2. The method of claim 1 wherein said liquid of step (A) includes said ASA and a surfactant.

3. The method of claim 1 wherein said mixing means of step (D) imparts a number of shear events to the emulsion which is sufficient to provide an energy factor index in the range of about 2200–17000.

4. The method of claim 3 wherein said energy factor index is about 5632–5800.

5. The method of preparing an alkaline size, alkenyl succinic anhydride ("ASA") in a heated emulsion, said method comprising the steps of:
   A. supplying a liquid including at least ASA;
   B. feeding a portion of said liquid of step (A) to a first input of a manifold;
   C. feeding a first stream of emulsifier into a second input to said manifold, said liquid combining with said heated emulsifier within said manifold to form a second stream comprising a mixture of at least ASA and said emulsifier;
   D. feeding the second stream of step (C) through a mixing means which imparts energy to break down said ASA into particles and form an emulsion;
   E. dividing an outflow from said mixing means (i) through a recycling loop to at least a third input of said manifold to recycle said emulsion and (ii) to an output stream of said system, said output stream having a ratio of ASA to emulsifier set by the relative volumes of said streams of Step (C);
   F. feeding said recycled emulsion of step (Ei) into said mixing means of step (D); and
   G. cooling said second stream in order to prevent said heated mixture from causing said ASA to deteriorate from heat imparted by activity of said mixing means in step (D).

6. The method of claim 5 wherein said cooling of step (G) comprises the further step of enclosing at least some equipment for providing said method in a temperature controlled environment.

7. The method of claim 5 wherein said enclosure providing said temperature controlled environment is a cooling housing.

8. The method of claim 5 and the further step of providing a heat exchanger in the recycle loop of the step (Ei).

9. The method of claim 8 wherein the heat exchanger is selected from a group consisting of a plate and frame, a tube heat exchanger, a heat sink having cooling fins, or a radiator.

10. The method of claim 5 wherein said manifold is a block of metal having a plurality of holes therein to form bores which provide a network of pipes for transporting and delivering fluids to enable a performance of said steps, thereby minimizing an internal surface area of a delivery system for performing said steps, and said cooling of step (G) is provided by enclosing at least said manifold block in an equipment for providing a temperature controlled environment.

11. The method of claim 5 wherein said heated emulsifier of step (C) is hot starch, and the added step of feeding said hot starch emulsifier into said manifold via an analog flow meter for reporting said feeding to a programmed logic controller and the further step of controlling at least one valve responsive to said reporting by said analog flow meter.

12. The method of claim 11 wherein said valve controlled responsive to said reporting is in said recycling loop of step (Ei).

13. The method of claim 11 and the further step of providing a variable speed pump for feeding at least one fluid material into said manifold, and controlling said variable speed of said pump to throttle said material feed into said manifold responsive to said report by said analog flow meter.

14. The method of claim 5 wherein said combined emulsifier and ASA of step (C) is diluted,
   carrying out said dilution in said mixing means of step (D), said mixing means imparting a shear force to said emulsion with an energy factor index in a range of about 2200 to 17000; said energy factor continuing for a period of time wherein a total of said shear force is less than that which reduces effectiveness by degrading substantial amounts of ASA, a substantial portion of said ASA being formed into particles having a mean average particle size within the range of 0.25–2$\mu$.

15. The method of claim 14 wherein the mixing device imparts said shear force in step (C) with an energy factor index in the approximate range of about 5632–5800.

16. The method of claim 14 wherein step (F) is carried out in a manifold formed by holes in a solid block of metal, said holes being inter-connected in order to form a network of pipes within said manifold.

17. A method of processing a paper coating liquid containing at least ASA, said method comprising the steps of:
   A. processing said coating liquid in a mixing manifold formed by bores in a solid block of metal;
   B. subjecting said ASA while outside said manifold to an energy factor index in a range of about 2200 to 6000 to provide a high level of opportunities for said ASA to be exposed to shear, said ASA responding to said shear at said energy factor index during a time period for breaking said ASA into emulsion particles having a mean average size in the order of 0.5 to 5 microns;
   C. forcing said ASA particles of step (B) into a stream containing an emulsifier while inside said manifold;
   D. subjecting said stream of step (C) containing said emulsifier and ASA to a primary dilution while in said manifold;
   E. recycling a majority of said stream of step (D) to re-experience a repeated exposure to said high level of shear of step (B);
   F. sending a minority of said stream of step (D) to a system output after it leaves said exposure to shear of step (B); and
   G. subjecting said stream of step (F) to a secondary dilution while on its way to said system output in order to provide a finely tuned amount of emulsifier and ASA relative to the total amount of said system output.

18. The method of claim 17 wherein the ASA is blended with a surfactant by the time when it is subjected to said shear at said energy factor index in step (B).

19. The method of claim 18 wherein said high level of shear in steps (B) and (E) is imparted with an energy factor index in the order of about 5632–5800.

20. The method of claim 17 wherein the shear at said energy factor index is imparted by a device selected from a group consisting of: a turbine; a centrifugal pump; a ganged stack of impellers; and a blender, said selected device having a recycle feedback loop connected between an output of said device and an inlet of said device; the recycling in step (E) of said majority of said stream occurring by diverting a portion of an output stream from said device through said feedback loop to an inlet of said manifold.

21. The method of any one of the claims 1, 5, or 17 further comprising the step of continuously testing the particles during a production run, using a control means operating responsive to a detection of a light scatter and absorption.

22. The method of any one of the claims 1, 5, or 17 wherein said shear is carried out with an energy factor index which produces particles in said ASA, said particles having a mean average in a range of 0.5 to 3 microns.

23. The method of any one of the claims 1, 5, or 17 wherein said shear is carried out with an energy factor which produces particles in said ASA, said particles having a mean average of about 1 micron.

24. A system for processing a mixture of alkenyl succinic anhydride ("ASA") and an emulsifier comprising:
   a miniature manifold formed by holes formed in a metal block, said holes forming a network of pipes and a mixing chamber inside said metal block;
   means for conveying ASA and a heated emulsifier to selected ones of said holes for mixing in said mixing chamber inside said metal block;
   mixing means for imparting energy to a stream of said mixed ASA and emulsifier in order to break said ASA into particles and form an emulsion;
   means for feeding back at least some of said stream via a recycle loop extending from said mixing means to another hole in said manifold; and
   means for cooling said stream in said mixing loop to reduce the heat of said emulsion and heat imparted to said stream by said mixing means.

25. The system of claim 24 and a programmed logical controller for controlling said system, at least one analog flow meter coupled to monitor an inflow of said emulsion and to report said inflow to said programmed logical controller, at least one automatic throttle means in at least one input to said block, and means jointly responsive to said programmed logic controller and said report by said flow meter for controlling said automatic throttle means.

26. The system of claim 25 wherein said throttle means is an automatic valve in said recycle loop.

27. The system of claim 25 wherein said throttle means is a variable speed pump for feeding said emulsifier into said system.

28. The system of claim 25 and said means for cooling is carried out at a temperature which prevents hydrolyzation of said ASA.

29. The system of claim 28 wherein said cooling means is a temperature controlled enclosure surrounding at least part of said system.

30. The system of claim 28 wherein said cooling means is a heat exchanger in said recycle loop.

31. The system of claim 30 wherein said energy factor is about 5632–5800.

32. The system of claim 24 wherein said mixing means imparts energy with an energy factor index in a range of about 2200–6000.

33. The system of claim 24 wherein said mixing means produces ASA particles having an average mean size within a range of about 0.25–2$\mu$.

34. The system of claim 24 further comprising control means for enabling a continuous testing of particles during a production run, said control means operating responsive to a detection of a light scatter and absorption.

35. The system of claim 24 wherein said shear is carried out with an energy factor index which produces particles in said ASA, said particles having a mean average in a range of 0.5 to 3 microns.

36. The system of claim 24 wherein said shear is carried out with an energy factor which produces particles in said ASA, said particles having a mean average of about 1 micron.

37. A system for preparing ASA by processing said ASA within a manifold formed in a solid block of metal having a plurality of holes that are formed therein to provide a plurality of bores that function as a network of pipes for conveying liquids; a plurality of throttle means individually associated with inputs to said bores; a source of the ASA coupled to a first of said bores via one of said throttle means; means for pressurizing and conveying said ASA at a high pressure through said first bore in said block of metal; means for introducing an emulsifier into a second of said bores via a second of said throttle means; means within said manifold for combining said pressurized ASA and said emulsifier in a single stream; means comprising a recycling loop coupled from said manifold through mixing means for imparting an impacting shear with an energy factor index in the order of 2200–6000 and on to a third of said bores, said means for imparting shear continuing for a period of time which provides particles having a mean average within a range of 0.25–2$\mu$; pressure regulating means; and means for taking a system output from a fourth of said bores via said pressure regulating means.

38. A method of preparing an alkaline sizing comprising the steps of:
   A. forming a fluid by mixing an emulsifier and a sizing agent to form a combined fluid stream;
   B. applying a shear force to said combined fluid stream with enough shearing events per unit of time to produce a shearing force having an energy factor index of at least 2200 which produces particles in a mean average range of about 0.1 to 3 microns;
   C. dividing a stream created in step (B) into two parts;
   D. recycling one of said two parts of said stream of step (C) in order to rejoin the combined fluid formed in step A; and
   E. directing the other of said two parts of said stream of step (C) to an output in order to provide a finished stream.

39. The method of claim 38 and the added step of providing a solid block with a manifold formed therein, said steps involving said fluid being carried out in said manifold formed within said solid block.

40. The method of claim 38 and the further step of imparting said shearing force of step B with an energy factor index in an approximate range of 2200–6000.

41. The method of claim 38 and the further step of imparting said shearing force with an energy factor index in an approximate range of about 5632–5800.

42. The method of any one of the claims 38–41 wherein the mean average range of particle size is about 0.25–2 microns.

43. A method of breaking alkenyl succinic anhydride ("ASA") into a predetermined range of particle sizes having a predetermined mean average particle size, said method comprising:

(1) providing at least one mixing head means having a predetermined number of blades in an area containing ASA;
   (2) operating said mixing head means at a predetermined speed whereby said blades strike the ASA to impart a selected number of shearing events per unit of time; and
   (3) selecting a time period during which said operations of step 2 occur in order to produce an energy factor index in a range of about 2200–17000;
   said energy factor index being determined by the relationship:

$$\frac{(\text{number of said shearing events}) \times (\text{velocity of said blades in ft/min}) \times (\text{contact time})}{1{,}000{,}000}.$$

44. The method of claim 43 wherein said mixing head means is a rotating set of said blades and said number of shearing events in step (2) is determined by the relationship:

$$(\text{number of blades}) \times (\text{number of mixing head means}) \times (\text{revolutions per minute}).$$

45. The method of claim 43 wherein said energy factor index of step (3) is in the range of about 5632–5800.

46. The method of claim 43 wherein said energy factor index of step (3) is in a range of about 2200–6000.

47. The method of claim 43 wherein the predetermined mean average particle size is within the range of 0.25–2μ.

48. The method of claim 43 wherein the predetermined mean average particle size is within the range of about 0.5 to 5 μ.

* * * * *